United States Patent [19]

Lea et al.

[11] 4,390,366

[45] Jun. 28, 1983

[54] PROCESS FOR THE EXTRACTION OF PRECIOUS METALS FROM SOLUTIONS THEREOF

[75] Inventors: Richard K. Lea, Watford; Julian D. Edwards, Chalfont St. Peter, both of England; D. Frederick Colton, Burlington, Canada

[73] Assignee: Inco Limited, Toronto, Canada

[21] Appl. No.: 298,355

[22] Filed: Sep. 1, 1981

[30] Foreign Application Priority Data

Sep. 5, 1980 [GB] United Kingdom ................ 8028662

[51] Int. Cl.$^3$ ........................ C01G 7/00; C01G 55/00
[52] U.S. Cl. .............................. 75/101 BE; 75/108; 423/22; 423/24
[58] Field of Search .............. 423/22, 24; 75/101 BE, 75/108

[56] References Cited

U.S. PATENT DOCUMENTS

| | | | |
|---|---|---|---|
| 3,856,912 | 12/1974 | Vesely | 423/22 |
| 3,935,006 | 1/1976 | Fischer | 75/118 R |
| 3,960,549 | 6/1976 | MacGregor | 75/108 |
| 3,979,207 | 9/1976 | MacGregor | 75/121 |
| 3,985,552 | 10/1976 | Edwards | 75/101 BE |

FOREIGN PATENT DOCUMENTS

| | | |
|---|---|---|
| 2457672 | 6/1975 | Fed. Rep. of Germany . |
| 2459099 | 6/1975 | Fed. Rep. of Germany . |
| 1185332 | 3/1970 | United Kingdom . |
| 1490815 | 11/1977 | United Kingdom . |
| 2003846A | 9/1978 | United Kingdom . |
| 1527758 | 10/1978 | United Kingdom . |
| 2013644A | 8/1979 | United Kingdom . |
| 2065092 | 6/1981 | United Kingdom . |

OTHER PUBLICATIONS

P. Pascal: "Nouveau Traite de Chimie Minerale", vol. XIX, 1958, Masson, Paris (Fr) pp. 23, 175–177, 284–287, 468–471, 484–487 and 662–665.

Chem. Abst., vol. 80, No. 24, Jun. 17, 1974, Abstract 136051b, p. 175.

Chem. Abst., vol. 83, No. 16, Oct. 20, 1975, Abstract 135462m, p. 254.

Chem. Abst., vol. 85, No. 10, Sep. 6, 1976, Abstract 68907m, p. 410.

Chem. Abst., vol. 88, No. 16, Apr. 17, 1978, Abstract 114659u, p. 643.

Chem. Abst., vol. 89, No. 6, Aug. 7, 1978, Abstract 46980k, p. 196.

Chem. Abst., vol. 89, No. 22, Nov. 27, 1978, Abstract 186678t, p. 421.

Chem. Abst., vol. 91, No. 26, Dec. 24, 1979, Abstract 214515z, p. 198.

Chem. Abst., vol. 94, No. 26, Jun. 29, 1981, Abstract 212197k, p. 223.

The Platinum Group Metals: Part 1, R. J. Dosing, May 1980, pp. 41 to 48 (Unique Properties are Irreplaceable in Modern Industry).

The Platinum Group Metals: Part 2 How Industry Refines and Uses the Heavy Metals, R. J. Dosing, Jul. 1980, pp. 32 to 42.

Transcript of Talk Given by R. I. Edwards of NIM at the AIME Conference Held in New York, May 1978.

Paper Lonrho Process, L. Floyd, May 1978.

Solvent Extraction in Platinum Group Metal Processing, M. J. Cleare, P. Charles & D. J. Bryson, J. Chem. Tech., Biotechnol, 1979, pp. 210 to 224.

Refining of Gold From Precious Metal Concentrates by Liquid–Liquid Extraction, B. F. Rimmer, Chemistry & Industry, Jan. 19, 1974, pp. 63 to 66.

Countercurrent Extraction Separation of Some Platinum Group Metals, Part II, E. W. Berg & E. Y. Lau, Analytica Chimica Acta, 27, 1962, pp. 248 to 252.

*Primary Examiner*—Herbert T. Carter
*Attorney, Agent, or Firm*—Edward A. Steen; Francis J. Mulligan, Jr.; Raymond J. Kenny

[57] ABSTRACT

A process for sequentially and selectively separating gold and platinum group metals from aqueous solutions containing them is disclosed.

First, ruthenium and osmium are oxidized to their tetroxides and then removed from the solution. Then, gold is removed by solvent extraction preferably with dibutyl carbitol. Next, palladium and platinum are removed by solvent extraction with an alkyl sulphide and tributyl phosphate respectively, care being taken to reduce iridium in solution before platinum extraction to prevent it extracting with the platinum. Then the iridium is reoxidized and removed from solution. Finally, rhodium is removed from the solution.

Using this process gold, platinum and palladium of saleable purity can be extracted directly without the need for further refining steps.

15 Claims, No Drawings

PROCESS FOR THE EXTRACTION OF PRECIOUS METALS FROM SOLUTIONS THEREOF

This invention relates to the extraction of precious metals, that is to say some or all of gold and the six metals of the platinum group namely platinum, palladium, rhodium, iridium, ruthenium and osmium, from aqueous solutions containing them.

The platinum group metals commonly occur together in nature in varying proportions in complex ores. Other important sources of platinum group metals, and also of gold are concentrates formed in the refining of nickel-copper ore, for example, anode slimes from the electrorefining of copper or residues from the pressure carbonyl extraction of nickel. Such concentrates may also contain silver and base metal and other impurities, commonly copper, nickel, iron, selenium, tellurium, arsenic, antimony, tin, lead, bismuth and silica.

It is notoriously difficult to recover the precious metal values present is precious metal concentrates whether these be obtained from refining or from naturally occurring ores. Hitherto, it has been the practice in refining such concentrates to effect an initial separation by leaching with aqua regia to dissolve most of the gold, platinum and palladium present leaving a residue containing most of the other platinum group metals together with silver if present. The solution was treated to precipitate out the gold, platinum and palladium, and the other precious metals were recovered by selective leaching reactions after smelting with lead. In practice, the separation of metals was far from complete and as a result each of the metals had to undergo an extensive purification treatment. In addition to the process itself being expensive and complex this meant that at any given time, a considerable amount of money was tied up in intermediate products.

For these reasons, there has recently been considerable interest in the solvent extraction of gold, palladium and platinum from solutions thereof. Many suggestions have been made relating to suitable extractants for specific metals and some of these have been employed in the conventional process to replace individual precipitation steps. One of the main advantages of solvent extraction is that with a sufficiently selective solvent the metal obtained from the solvent after scrubbing will be of saleable purity. There have, however, been problems in employing more than one solvent extraction step in a particular process as most solvents are not selective between gold, platinum and palladium. Gold, platinum and palladium extracted in this way can also be contaminated by the other precious metals.

The present invention is based on the discovery that gold and all platinum group metal values may be recovered from a solution thereof by a selective separation process in which the sequence of separation is carefully controlled.

Accordingly, the present invention provides a process for sequentially and selectively separating gold and platinum group metal values from an chloride containing aqueous solution thereof comprising the steps of oxidising ruthenium and osmium to their respective tetroxides and removing the tetroxides from the solution; selectively removing gold from the solution by solvent extraction; selectively removing the palladium and platinum from the solution by solvent extraction with a dialkyl sulphide and tributyl phosphate (TBP) respectively, the platinum extraction being performed only after iridium in the solution has been reduced to the trivalent state; reoxidising iridium in the solution to the tetravalent state and removing it from the solution and finally extracting the rhodium from the remaining solution.

It is an important characteristic of the process that ruthenium and osmium are the first metal values to be removed from solution. If this is not done, they tend to contaminate the products from the other extraction steps and their recovery is substantially impaired. Suitable oxidising agents for the ruthenium and osmium include the chlorates, perchlorates and bromates of the alkali metals. The pH of the solution is generally adjusted to between 0 to 2 before the oxidising agent is added. The amount of oxidising agent used is suitably 7 to 10 times the stoichiometric amount required to oxidise all the ruthenium and osmium to their tetroxides. The tetroxides may be removed from the solution by solvent extraction or distillation. In this instance, distillation in preferred since it is easier, more effective and cleaner. To perform the distillation, the solution may be heated to just below its boiling point (90° to 95° C.) under reduced pressure. The volatile Ru and Os tetroxides distill off and may be trapped in hydrochloric acid from which they may be recovered by treatment with nitric acid followed by a further distillation to separate the osmium from the ruthenium. Ru and Os metals may be recovered by conventional means such as precipitation of their complex chlorides with ammonium chloride followed by ignition of the salt to metal. During distillation, as the oxidising reaction falls off the pH of the solution rises as the oxidising agent reacts with acid in the solution. In this connection, it is preferred to use sodium bromate as the oxidising agent because it "buffers" the pH of the solution at about 3 to 4 and favours hydrolysis (and thus precipitation) of most of the base metals in the solution together with a small amount of precious metals. If the solution contains a relatively large amount of base metals, it is desirable to remove the precipitate and treat it separately to recover the entrained precious metal values since the presence of base metals in solution may contaminate metals to be extracted subsequently. If the base metal content of the solution is low, the precipitate may be redissolved in situ by reacidifying the solution. Small amounts of base metals do not substantially affect the purity of subsequently extracted precious metals.

The next stage in the process is the removal of gold by solvent extraction. Almost any alcohol, ether or ketone which is immiscible with water can be used to extract the gold. A preferred extractant is dibutyl carbitol which has very good selectivity, a high boiling point and is widely available. The extraction of gold with dibutyl carbitol should be carried out as a continuous counter-current multistage process. The gold-loaded solvent may then be scrubbed with dilute hydrochloric acid to remove base metal impurities and gold may be reduced directly from the scrubbed solvent using a reducing agent such as aqueous oxalic acid. Gold of purity at least 99.5% can be produced in this way.

It is important to remove the gold from the solution down to a residual content of less than 2 ppm in order to avoid contamination of metals to be extracted subsequently. The raffinate from which the gold has been removed is distilled to remove any entrained and dissolved solvent and reacidified to a hydrochloric acid concentration of from 3 to 6 M.

The order in which palladium and platinum are extracted depends upon the diluent which is employed with the solvent (TBP) used to extract the platinum. Suitable diluents are chlorinated hydrocarbons such as 1, 2, 3-trichloropropane or aliphatic hydrocarbons, such as that sold by Esso as Isopar M, modified with Isodecanol to avoid formation of a third phase. Whilst TBP in a chlorinated diluent will selectively extract platinum in the presence of palladium, TBP in a hydrocarbon diluent is non-selective. If, therefore, the latter class of diluent is to be used the Pd should be extracted first. In practice, Pt is always slightly contaminated with Pd if it is attempted to remove the Pt before the Pd. It is, therefore, generally preferred to remove the Pd first. In any event, before Pt is removed from the solution, any iridium present must be reduced to the trivalent state since TBP will extract tetravalent iridium. The reduction may be achieved by addition of $SO_2$ to the solution until its redox potential relative to a standard calomel electrode is about +500 mV. Any selenium present in the solution will be precipitated at this stage and should be filtered off. This treatment will also reduce Pt in solution to the divalent state.

Palladium is removed from the solution by solvent extraction with a dialkyl sulphide. It is preferred to use di-n-octyl sulphide but other dialkyl sulphides that may be used are di-n-hexyl sulphide, methyl-n-decyl sulphide, and tertiary-butyl-decyl sulphide. Advantageously, the alkyl sulphide is dissolved in an aliphatic hydrocarbon solvent such as Shell MSB 210, Shellsol T, or Esso Isoar M. The extraction of palladium is quite slow and is therefore performed as a batch process in a stirred vessel. The phase ratio of oganic extractant to aqueous solution should be selected with reference to the concentration of Pd in the solution. The progress of the reaction may be monitored by repeatedly testing the Pd concentration of the aqueous phase and stirring should be continued until equilibrium has been reached. Generally the loaded organic phase is scrubbed with dilute hydrochloric acid and the palladium is stripped from the scrubbed organic phase with aqueous ammonia. Palladium metal may be recovered by precipitating the palladium salt $Pd(NH_3)_2Cl_2$ with hydrochloric acid and igniting the salt to metal. Palladium of purity at least 99.99% can be produced in this way.

Platinum is removed by solvent extraction with TBP. The TBP should be mixed with one of the diluents mentioned above. The extraction is preferably carried out as a continuous multi-stage counter-current process. The ratio of extractant to diluent and the phase ratio in the extraction process should be chosen with reference to the Pt content of the solution. The loaded organic phase may be scrubbed with hydrochloric acid and the Pt may be then stripped with water or very dilute (e.g. 0.1 M) acid or a alkali. Platinum metal may be recovered by reoxidising the metal value in solution to Pt(IV), converting it to ammonium chloroplatinate and igniting the salt to platinum metal. Platinum of purity at least 99.95% can be obtained in this way. The solution is then distilled to remove entrained and dissolved solvent.

The next stage is the extraction of iridium. (This cannot be done in the presence of Pt or Pd as they would contaminate the Ir). In order to extract the iridium it must be reoxidised to the tetravalent state. This may be effected by bubbling chlorine gas through the solution until its redox potential exceeds +100 mV. The iridium may be removed by solvent extraction with TBP in a similar way to the platinum. After scrubbing, the iridium may be stripped using a solution containing a reducing agent such as HCl saturated with $SO_2$. Iridium metal may be recovered by precipitating ammonium hexachloroiridate by the addition of ammonium chloride solution and then igniting the salt to metal. Alternatively, iridium may be precipitated directly from the reoxidised solution as ammonium hexachloroiridate. Metal obtained from this salt may be contaminated by traces of base metals and entrained rhodium.

Finally, the rhodium is extracted from the solution. Rhodium is the last platinum group metal to be removed because if it is attempted to remove it in the presence of the others, the rhodium will be contaminated. Rhodium may be extracted by treating the solution with a reducing agent such as formic acid or zinc and hydrochloric acid to precipitate the rhodium as rhodium black. The reduction may conveniently be performed at about 90° C. The rhodium black may be purified by conventional means.

The process will now be described in more detail with reference to an example.

EXAMPLE

The solution used was an aqueous chloride solution containing dissolved platinum, palladium, rhodium, ruthenium, iridium and gold together with base metals and silica. The solution also contained a small amount of dissolved osmium but no measurements were made of its concentration. However, as osmium almost always reacts in the same way as ruthenium, references in this example to the reactions of ruthenium should be taken to include osmium. The exact composition of the solution is shown in Table 1 below.

150 liters of this solution were treated with 40% NaOH solution to raise the pH to 1.7. During the pH adjustment, the temperature of the solution rose to 40° C.

Ruthenium Extraction

To the pH adjusted solution described above was added 22 liters of a 20% (weight per volume) solution of sodium bromate. The pressure in the vessel containing these reactants was reduced to slightly below atmospheric pressure and the temperature was raised to 80° C. to allow ruthenium tetroxide to distill off. The reaction was complete after 2 hours and by this time the pH of the solution had risen to 4. Small amounts of base metals had precipitated but as the base metal concentration in the solution was low (see Table 1), the precipitate was not removed. The solution was reacidified with hydrochloric acid so that its concentration in hydrochloric acid was 3 M. The precipitate dissolved upon reacidification. The final volume of the solution was 240 liters, and its composition was as shown in Table 1.

From the table it can be seen that nearly all the ruthenium originally present in the solution was removed. The ruthenium tetroxide was trapped in hydrochloric acid from which it was recovered as described above.

TABLE 1

| ELEMENT | SOLUTION BEFORE TREATMENT g/l | SOLUTION AFTER Ru REMOVAL g/l |
|---|---|---|
| Pt | 33.35 | 20.47 |
| Pd | 33.76 | 20.72 |
| Rh | 3.98 | 2.15 |

TABLE 1-continued

| ELEMENT | SOLUTION BEFORE TREATMENT g/l | SOLUTION AFTER Ru REMOVAL g/l |
|---|---|---|
| Ru | 3.52 | <0.1 |
| Ir | 1.59 | 0.89 |
| Au | 6.70 | 4.09 |
| Ag | <0.1 | <0.1 |
| Te | 2.1 | 1.3 |
| Sb | 0.1 | <0.1 |
| Sn | <0.1 | <0.1 |
| Pb | 1.0 | 0.7 |
| Bi | 0.1 | <0.1 |
| Cu | 0.2 | 0.2 |
| Zn | 0.8 | 0.4 |
| Ni | 0.6 | 0.4 |
| Fe | 0.5 | 0.6 |
| As | 0.36 | 0.28 |

Gold Extraction 123 liters of the reacidified solution from the ruthenium extraction was subjected to solvent extraction with dibutyl carbitol in a continuous two-stage counter-current process using a phase ratio (aqueous:organic) of 2.6:1. (All phase ratios given hereafter are aqueous:organic). The loaded organic phase was scrubbed with 1.9 M hydrochloric acid in a 3 stage counter-current process using a phase ratio of 2.4:1 to remove base metals extracted with the gold. After scrubbing, the loaded organic phase was treated with a 10% (weight per volume) aqueous solution of oxalic acid in a single stage batch process at 70° C. for 2 hours to reduce the gold. Gold powder settled at the bottom of the vessel. After washing and drying, the powder was assayed and found to have a purity greater than 99.99% gold. This constitutes gold of saleable purity.

The compositions of the raffinate (i.e. aqueous phase after solvent extraction) and the scrub liquor are shown in Table 2 below.

TABLE 2

| ELEMENT | RAFFINATE COMPOSITION g/l | SCRUB LIQUOR COMPOSITION g/l |
|---|---|---|
| Pt | 19.57 | 0.51 |
| Pd | 20.48 | 0.07 |
| Rh | 2.12 | 0.004 |
| Ru | <0.1 | 0.018 |
| Ir | 0.86 | 0.014 |
| Au | <0.001 | 0.004 |
| Ag | <0.1 | 0.007 |
| Te | 0.9 | 0.61 |
| Sb | 0.1 | 0.06 |
| Sn | <0.1 | 0.05 |
| Pb | 0.3 | <0.01 |
| Bi | <0.1 | <0.01 |
| Cu | <0.1 | <0.01 |
| Zn | 0.5 | 0.02 |
| Ni | 0.3 | <0.01 |
| Fe | <0.1 | 0.89 |
| As | 0.1 | 0.18 |

From the table, it can be seen that the gold was almost completely removed from the solution, the residual gold content being less than 1 ppm. Some iron was extracted along with the gold but was removed from the dibutyl carbitol by the scrubbing process. The raffinate was distilled to remove entrained and dissolved solvent.

Palladium Extraction 33 liters of the purified raffinate from the gold extraction were diluted to 50 liters with concentrated hydrochloric acid giving a solution of acidity approximately 6 M. The composition of the solution is shown in Table 3 below. The solution was extracted with a 20% vol/vol solution of dioctyl sulphide in Shellsol T in a single stage batch process at a 1:1 phase ratio. The mixture of solutions was stirred for 3 hours and then allowed to settle. The loaded organic phase was scrubbed 3 times in a batch process using a 1:1 phase ratio. For the first two scrubs, equal volumes of concentrated hydrochloric acid and water were used whilst the third scrub was performed with 0.5 M HCl. In each scrub, the liquids were stirred together for 30 minutes and then allowed to settle for 30 minutes. Palladium was stripped from the scrubbed loaded organic phase using a 25% vol/vol aqueous solution of 880 ammonia at a 1:1 phase ratio. The liquids were stirred together for 30 minutes, then left to settle overnight. The strip liquor was run off, and acidified to 2% (weight per volume) HCl to precipitate $Pd(NH_3)_2Cl_2$. The salt was filtered off, washed with water, dried and then ignited to metal. The metal was assayed and found to be 99.998% palladium. This constitutes palladium of saleable purity.

The compositions of the feed solution before solvent extraction, the raffinate after extraction and the three scrub liquors are show in Table 3 below.

TABLE 3

| ELEMENT | FEED SOLUTION g/l | RAFFINATE g/l | SCRUB LIQUOR 1 ppm | SCRUB LIQUOR 2 ppm | SCRUB LIQUOR 3 ppm |
|---|---|---|---|---|---|
| Pt | 12.48 | 12.33 | 37 | <1 | <1 |
| Pd | 13.37 | 0.001 | <0.1 | <0.1 | <0.1 |
| Rh | 1.47 | 1.31 | 5 | <0.1 | <0.1 |
| Ru | <0.1 | <0.1 | 3 | <0.1 | 1.3 |
| Ir | 0.57 | 0.55 | <2 | <2 | <2 |
| Au | <0.001 | <0.001 | <0.1 | <0.1 | <0.1 |
| Ag | <0.1 | 0.04 | <0.05 | <0.05 | <0.05 |
| Te | 0.5 | 0.52 | not measured | | |
| Sb | <0.07 | <0.05 | | | |
| Sn | <0.07 | <0.05 | | | |
| Pb | 0.3 | 0.13 | | | |
| Bi | <0.07 | <0.05 | | | |
| Cu | 0.07 | 0.07 | | | |
| Zn | 0.3 | 0.33 | | | |
| Ni | 0.2 | 0.21 | | | |
| Fe | <0.07 | 0.06 | | | |
| As | 0.18 | 0.14 | | | |

Platinum Extraction

The feed solution was the raffinate from the palladium extraction. Before the platinum was extracted, the potential of the solution was reduced from +710 mV to +460 mV by addition of $SO_2$. Some elemental selenium was precipitated during this reduction, and the solution was filtered to remove this. Then the solution was extracted with a 40% vol/vol solution of TBP in 1, 2, 3-trichloropropane in a continuous three-stage counter-current process using a phase ratio of 2.4:1. The loaded organic phase was scrubbed with 5 M HCl in a continuous two-stage counter-current process using a phase ratio of 4.8:1. The scrubbed organic phase was then stripped with 0.2 M HCl in a continuous two-stage counter-current process using a phase ratio of 1.5.:1. The strip liquor was evaporated to about one sixth of its original volume, the platinum was oxidised to Pt(IV)

with chlorine gas and an excess of saturated NH4Cl solution was added at 80° C. to precipitate ammonium chloroplatinate. The mixture was allowed to cool and than the platinum salt was filtered off, washed and ignited to platinum metal. The metal was assayed and found to have a purity greater than 99.99%. This constitutes platinum of saleable purity. The compositions of the feed solution, raffinate after extraction, scrub liquor and strip liquor are shown in Table 4 below.

TABLE 4

| ELE-MENT | FEED SOLUTION g/l | RAFFINATE g/l | SCRUB LIQUOR g/l | STRIP LIQUOR g/l |
|---|---|---|---|---|
| Pt | 12.39 | 0.004 | 2.58 | 6.16 |
| Pd | 0.001 | 0.001 | <0.002 | <0.002 |
| Rh | 1.34 | 1.56 | 0.003 | <0.0015 |
| Ru | <0.1 | <0.1 | 0.014 | 0.012 |
| Ir | 0.54 | 0.55 | 0.023 | <0.02 |
| Au | <0.001 | <0.001 | 0.001 | <0.002 |
| Ag | 0.028 | 0.035 | 0.007 | <0.001 |
| Te | 0.6 | 0.23 | <0.005 | 0.06 |
| Sb | 0.06 | <0.005 | <0.005 | <0.01 |
| Sn | <0.05 | <0.005 | <0.005 | <0.01 |
| Pb | 0.08 | 0.07 | <0.005 | <0.01 |
| Bi | <0.05 | 0.01 | <0.005 | <0.01 |
| Cu | 0.06 | 0.05 | 0.02 | <0.01 |
| Zn | 0.3 | <0.005 | 0.19 | 0.1 |
| Ni | 0.2 | 0.23 | <0.005 | <0.01 |
| Fe | <0.05 | <0.005 | <0.005 | <0.01 |
| As | 0.14 | — | — | — |

From the table, it can be seen that the platinum was almost completely removed from the solution.

The raffinate was distilled to remove entrained and dissolved solvent.

Iridium Extraction

The feed solution was the purified raffinate from the platinum extraction. Both solvent extraction and precipitation processes for the recovery of iridium will be described.

Before iridium was recovered from the solution, chlorine was bubbled through it until the redox potential of the solution rose to above +1000 mV.

(a) Solvent extraction: The extraction was performed, using the same extractant solution as for platinum, in a 3-stage batch process at a 1:1 phase ratio. The concentration of iridium in the raffinate was 0.013 g/l and no rhodium was extracted. The loaded organic phase was scrubbed in a single stage batch process using 6 M HCl at a 1:1 phase ratio. No iridium reported in the scrub liquor. The scrubbed organic phase was stripped with 0.23 M HCl saturated with $SO_2$ in a single stage batch process at a 1:1 phase ratio. Iridium metal may be recovered by concentrating the strip liquor by boiling and then treating it with an excess of saturated NH4Cl solution to precipitate ammonium chloroiridate. The salt may be filtered off, washed and ignited to metal.

(b) Precipitation: To the oxidised feed solution was added 1.1 liters of saturated NH4Cl solution. Crude ammonium chloroiridate was precipitated, filtered off and washed with dilute NH4Cl solution. The residual iridium content of the filtrate was 33 ppm i.e. over twice that in the raffinate for solvent extraction. The solvent extraction method is also to be preferred in that the iridium salt produced is more pure. The iridium salt from precipitation would need further refining before iridium metal of saleable purity could be produced.

Rhodium Extraction

The solution from the iridium extraction was treated to recover rhodium by reduction using formic acid. The reduction was performed at 90° C. and continued until the solution was colourless. Rhodium black, an impure form of rhodium metal was precipitated. Rhodium black may be refined to yield pure rhodium of saleable quality by conventional means.

To demonstrate the importance of removing ruthenium and osmium as the first step, the gold, palladium and platinum extraction steps described above were repeated without first removing the ruthenium and osmium. Whilst the gold and palladium were not unduly contaminated, the purity of the platinum produced was only 99.95% and it was contaminated by 320 ppm of osmium.

We claim:

1. A selective solvent extraction process for sequentially and selectively separating and removing gold and platinum group metal values from a chloride containing aqueous solution, the process comprising:
   (a) oxidizing ruthenium and osmium to their respective tetraoxides by adding an oxidizing agent to the solution,
   (b) adjusting the solution in step (a) above to about 0-2 pH units before the oxidizing agent is added and adding about 7-10 times the stoichiometric amount of the oxidizing agent required to oxidize all of ruthenium and osmium to their tetraoxides,
   (c) removing the tetraoxides from the solution,
   (d) selectively removing gold from the solution by solvent extraction to a residual content of less than two parts-per-million in order to avoid contamination of metals to be extracted subsequently,
   (e) removing the remaining solvent in the solution and reacidifying the solution to a hydrochloric acid concentration of from 3 to 6 M,
   (f) selectively removing palladium from the solution by solvent extraction with a dialkyl sulfide,
   (g) reducing iridium to the trivalent state until its redox potential is about +500 mV relative to a standard colomel electrode,
   (h) selectively removing platinum from the solution by solvent extraction with tributyl phosphate and then removing the solvent from the solution,
   (i) reoxidizing the iridium to the tetravalent state and extracting the trivalent state from the solution by solvent extraction with tributyl phosphate, and
   (j) extracting the rhodium with a reducing agent.

2. The process according to claim 1, wherein the ruthenium and osmium are oxidized by an oxidizing agent selected from the group consisting of the chlorates, perchlorates and bromates of the alkali metals.

3. The process according to claim 2 wherein the ruthenium and osmium are oxidized by sodium bromate.

4. The process according to claim 2, wherein the tetraoxides are removed by distillation, trapping the distilled tetraoxides in hydrochloric acid, recovering ruthenium and osmium with nitric acid, separating the ruthenium and osmium by distillation, precipitating the ruthenium and osmium with ammonium chloride and igniting the resulting salts to get metal values.

5. The process according to claim 1, wherein the gold is extracted from the solution by a solvent selected from the group consisting of alcohol, ether and ketone.

6. The process according to claim 5, wherein the gold is extracted from the solution by dibutyl carbitol.

7. The process according to claim 6, wherein the gold laden solvent is scrubbed with hydrochloric acid, and directly reducing the gold with acqueous oxalic acid.

8. The process according to claim 1, wherein the palladium is extracted by a dialkyl sulphide selected from the group consisting of di-n-octyl sulphide, di-n-hexyl sulphide, methyl-n-decyl-sulphide, wherein the dialkyl sulphide is dissolved in an aliphatic hydrocarbon solvent.

9. The process according to claim 8, wherein the solution is scrubbed with hydrochloric acid and the palladium is stipped from the solution with aqueous ammonia, precipitating the palladium salt with hydrochloric acid and igniting the salt to get palladium metal.

10. The process according to claim 1, wherein the iridium is reduced by adding sulphur dioxide to the solution.

11. The process according to claim 1, wherein the platinum is extracted by tributyl phosphate mixed with a dilient selected from the group consisting of chlorinated hydrocarbons and aliphatic hydrocarbons.

12. The process according to claim 11, wherein the solution is scrubbed with hydrochloric acid, stripping the platinum, reoxidizing the platinum to the IV state, coverting the platinum to ammonium chloroplatinate and igniting the resultant salt to get platinum metal.

13. The process according to claim 1, wherein the iridium is reoxidized to the tetravalent state by bubbling chlorine gas through the solution until its redox potential exceeds +1000 mV.

14. The process according to claim 13, wherein the iridium is reduced by hydrochloric acid saturated with sulphur dioxide, precipitating ammonium hexachloroiridate by adding ammonium chloride and igniting the resultant salt to get iridium metal.

15. The process according to claim 1, wherein the rhodium is reduced by a reducing agent selected from the group consisting of formic acid and zinc, the reducing agent mixed with hydrochloric acid to precipitate rhodium black and purifying the rhodium black.

* * * * *

UNITED STATES PATENT AND TRADEMARK OFFICE
CERTIFICATE OF CORRECTION

PATENT NO. : 4,390,366
DATED : June 28, 1983
INVENTOR(S) : RICHARD K. LEA, JULIAN D. EDWARDS & D. FREDERICK COLTON It is certified that error appears in the above-identified patent and that said Letters Patent is hereby corrected as shown below:

Column 2, line 61: "99.5%" should read -- 99.95% --
Column 3, line 67: "100mV" should read -- 1000mV --
Column 7, line  4: "than" should read -- then --

Signed and Sealed this

Twenty-second Day of November 1983

[SEAL]

Attest:

GERALD J. MOSSINGHOFF

Attesting Officer    Commissioner of Patents and Trademarks